United States Patent [19]

Dohrer

[11] Patent Number: 5,208,096

[45] Date of Patent: * May 4, 1993

[54] SINGLE-SIDED CLING STRETCH FILM

[75] Inventor: Gregory L. Dohrer, Broken Arrow, Okla.

[73] Assignee: Paragon Films Incorporated, Broken Arrow, Okla.

[*] Notice: The portion of the term of this patent subsequent to Mar. 3, 2009 has been disclaimed.

[21] Appl. No.: 638,615

[22] Filed: Jan. 8, 1991

Related U.S. Application Data

[63] Continuation-in-part of Ser. No. 462,504, Jan. 8, 1990.

[51] Int. Cl.$^5$ ............................................. B32B 27/08
[52] U.S. Cl. ..................................... 428/218; 428/220; 428/349; 428/516; 428/518; 428/331
[58] Field of Search ............... 428/218, 576, 578, 517, 428/520, 349

[56] References Cited

U.S. PATENT DOCUMENTS

| | | | |
|---|---|---|---|
| 3,547,754 | 2/1970 | Tokos et al. | 428/220 |
| 4,367,256 | 1/1983 | Biel | 428/218 |
| 4,399,180 | 8/1983 | Briggs et al. | 428/212 |
| 4,418,114 | 11/1983 | Briggs et al. | 428/218 |
| 4,425,268 | 1/1984 | Cooper | 524/110 |
| 4,436,788 | 3/1984 | Cooper | 428/483 |
| 4,518,654 | 5/1985 | Eichbauer et al. | 428/331 |
| 4,542,188 | 9/1985 | Van der Heijden | 525/240 |
| 4,671,987 | 6/1987 | Knott et al. | 428/216 |
| 4,820,589 | 4/1989 | Dobreski et al. | 428/516 |
| 4,833,017 | 5/1989 | Benoit | 428/516 |
| 4,923,750 | 5/1990 | Jones | 428/349 |
| 5,019,315 | 5/1991 | Wilson | 264/171 |

Primary Examiner—P. C. Sluby
Attorney, Agent, or Firm—Pravel, Hewitt, Kimball & Krieger

[57] ABSTRACT

This invention relates to a single-sided cling stretch wrap film wherein the A layer exhibits a high cling force. The opposite surface is cling-free and is fabricated from a polyolefin having a MFR less than or equal to 10.0. A particularly preferred film is an A/B/C thermoplastic film of high tensile strength. Pallet loads overwrapped with the film are neither torn or destroyed when separated from each other. The cling-free layer may contain a medium or high density polyethylene. The productivity in the fabrication of the polyolefin film is improved by the use of medium or high density polyethylene.

19 Claims, No Drawings

SINGLE-SIDED CLING STRETCH FILM

This application is a continuation-in-pat application of Ser. No. 07/462,504, filed Jan. 8, 1990.

FIELD OF THE INVENTION

This invention is drawn to a single-sided stretch wrap film containing one surface which exhibits a cling property and an opposite surface which is cling-free. The cling-free layer has a slide property when its surfaces are in contact with relative motion with a cling-free layer of a second like film. The invention in particular is drawn to a high tensile strength A/B/C film structure, wherein the A surface exhibits cling properties, the B layer is primarily responsible for the high tensile strength of the film structure and the C layer is substantially cling free. The cling-free surface of the film of this invention is fabricated from a film forming system containing a polyolefin having a MFR less than 10.0 (ASTM D-1238). The filmforming system of the cling-free surface may further contain a high or medium density polyethylene. The invention is further drawn to a method of improving productivity in the production of a polyolefin selected from polypropylene homopolymers, polyethylene homopolymers and copolymers of ethylene or propylene and an o-olefin. The addition of a medium or high density polyethylene to the polyolefin increases productivity as much as 60%.

BACKGROUND OF THE INVENTION

One of the problem areas in the packaging industry concerns the overwrap packaging of goods, particularly the unitization of pallet loads. Ideally, an overwrap material should have high strength, be resistant to tear and puncture, and exhibit single-sided cling properties. In particular, single-sided cling properties are required in order to prevent individual pallets from clinging to each other and being torn or destroyed when being separated from each other.

Development of single-sided cling has, generally, been directed toward surface modifying one side of an A/B film. For example, U.S. Pat. No. 4,820,589 discloses an A/B film structure, wherein the A layer has a comparatively high cling force to layer B and layer B has substantially less cling force to a layer of itself. The B layer contains nylon. Further, single and two-layer film structures are further disclosed in U.S. Pat. Nos. 4,518,654 and 4,833,017, herein incorporated by reference. In U.S. Pat. No. 4,518,654, the "non-cling" B layer is a polyolefin with an anti-cling additive such as crystalline or amorphous silica, sodium aluminum silicate, diatomaceous earth, and talc. It is not possible to obtain a zero cling force for the B layer, however, since the additive must be present in minimal quantities in order to prevent tearing or fracturing of the film. Further, the coefficient of friction of such films is greater than 2.0 which indicates an unfavorable slideability property of the B layer. Also further, the minimum stretch capability of such films is approximately 50%. Thus, such films neither exhibit a truly cling-free layer or the maximum tensile strength and minimum stretch capability which is commercially demanded.

In order to prevent the tearing or loosening of the wrapping on stacked overwrapped pallet loads, it would be highly desirable to have a tough film exhibiting high tensile strength and greater elongation with good cling properties on one side to engage the contained load and little or no cling properties on the other side to avoid clinging to neighboring stacked, wrapped loads.

SUMMARY OF THE INVENTION

The invention comprises novel stretch wrap films and an improved process for preparing such films. In particular, the stretch wrap films of this invention (1) exhibit high tensile strength and an improved minimum stretch capability, (2) are tear and puncture resistant, and (3) have single sided cling. Such films are ideally suited for use in overwrapping of packages and pallet loads. The stretch wrap film of this invention is prepared as a co-extrusion product of the respective layers. One surface of the stretch wrap film of this invention exhibits cling. The opposite surface, fabricated from a polyolefin having a MFR less than 10.0, is cling-free. The stretch wrap film of this invention includes a thermoplastic A/B/C film structure of differential cling wherein layer A has a high cling force to layer B, layer B is a core layer with high tensile strength, and layer C has little, if any, cling properties.

The invention further comprises a method for fabricating polyolefin films (including the stretch wrap films referenced above) by incorporating a medium density polyethylene or high density polyethylene with the polyolefin in the rotating extruder.

DETAILED DESCRIPTION OF THE INVENTION

The invention comprises a single-sided cling stretch wrap film. In order to achieve the desired single-sided cling properties a co-extruded film structure is utilized. The surface of the film structure of this invention having a cling force is referred to herein as the A surface. The surface opposite the A surface is cling-free. In other words, the cling force of this surface of the film structure to the surface opposite the A surface of a like film is negligible and ideally is not detectable. Further, the surface opposite the A surface is characterized by a slide property when it is in contact with the like layer of a second like film and when there is relative motion between the two surfaces. The coefficient of friction of these two surfaces is between about 0.2 to about 2.0, and most preferably is less than 1.0, as measured by ASTM 1894.

The film-forming component of the cling-free layer of the film structure of this invention imparts a non-cling-slip surface to the extruded film. The film forming system from which this surface is fabricated contains a polyolefin having a MFR less than or equal to ten. (Melt flow ratios, MFR, referred to herein are in accordance with ASTM D-1238). Such polyolefins are most preferably homopolymers of propylene and copolymers of propylene and α-olefins. Homopolymers of ethylene and copolymers of ethylene and a $C_3$–$C_{10}$ α-olefin having a density greater than 0.925 g/cc are likewise preferred. Suitable α-olefins for the propylene and ethylene copolymers have three to 10 carbon atoms and are monoolefinic. The amount of α-olefin in the copolymer is generally between about 0.5 to 20, most preferably less than 5, weight percent. The use of such polyolefins in the cling-free layer makes unnecessary the addition of anti-cling additives or "slip additives." The coefficient of friction of the cling-free surface of the film of this invention to the cling-free surface of a second like film structure is less than 2.0 and generally less than 1.0.

(Coefficient of friction measurements referenced herein are in accordance with ASTM 1894).

As explained more fully below, the film-forming system of the cling-free surface may further contain a high density polyethylene (HDPE) or medium density polyethylene (MDPE). Generally, between about 10 to about 50 weight percent MDPE or HDPE is preferred. A HDPE has a maximum density greater than or equal to 0.940 g/cc. Such polymers are often copolymers of ethylene with a $C_3$-$C_{10}$ α-olefin, such as propylene or butene. Normally the amount of α-olefin is approximately 0-5%, preferably 0-2 percent. Where the density is 0.960 q/cc or greater a homopolymer of ethylene may be used. MDPE is defined as having a minimum density ranging from about 0.925 to about 0.940, preferably about 0.935. MDPE are copolymers of ethylene and at least one of the $C_3$-$C_{10}$ olefins recited above. (It is well recognized in the art that the density of the copolymer decreases as the amount of comonomer increases.)

The cling force of the A surface of the film structure of this invention to the A surface of a like film (of identical composition) is between about 150 g to about 400 g. (Cling force measurements referred to herein are in accordance with ASTM D4649 wherein the surfaces of the films are in an unstretched condition.)

The A layer for use in the present invention is fabricated from a resin possessing an inherent cling property and/or a cling property resulting from the incorporation of a cling additive. Examples of such resin film-forming compositions are polyolefins such as polyethylene, atactic polypropylene, copolymers of ethylene and propylene, and polymers obtained from ethylene and/or propylene copolymerized with relatively minor amounts of an ethylenically unsaturated monomer such as a mono-olefin, preferably a C—C mono-olefin, such as butene-1 and isobutylene, acrylic acid, methacrylic acid, esters of acrylic acids, vinyl acetate, styrene and combinations thereof. Preferred is polyethylene, including high and low molecular weight polyethylene, and copolymers of ethylene as set forth above.

Suitable for the cling film portion of the stretch wrap film of the present invention are those resin-forming systems which do not exhibit a fairly high level of cling without the addition of a cling additive such as linear low density polyethylene (LLDPE). LLDPE is defined as having a maximum density ranging from about 0.912 g/cc to about 0.925 g/cc, preferably about 0.917 g/cc. LLDPE, characteristically has a melt flow value (ASTM D 1238 Cond. E) ranging from about 0.3 to about 10.0, preferably about 2.3, and is a copolymer of ethylene with a $C_4$-$C_{10}$ olefin, for example, butene-1; 1,3-dimethyl-butene-1; 1,3-dimethyl-pentene-1; hexene-1; 4-methyl-penetene-1; 3-methyl-hexene-1; octene-1; or decene-1. The alpha-olefin is usually between 1 to 20 weight percent of the copolymer. Further, ultra low density polyethylene (ULDPE) and linear medium density polyethylene (LMDPE) is also particularly preferred. ULDPE is defined as having a maximum density ranging from about 0.890 g/cc to about 0.915 g/cc, preferably about 0.912 g/cc and contains a higher percentage of the C-C olefin. LMDPE has a density between about 0.925 to about 0.940 and likewise is a copolymer of ethylene and a $C_3$-$C_{10}$ olefin.

Resins not inherently possessing cling properties can nevertheless be used in this invention by incorporating with the resin a cling additive.

The resin film-forming film of the A layer may contain any known cling agent which will be effective in maintaining the A layer in cling contact with the surface of a cling-free layer of a second like film of like composition. Nonlimiting examples of cling additives include, for example, such tackifiers as polybutene and low molecular weight polyisobutylene, preferably between 200-3000, most preferably 200-300. Other suitable tackifiers include polyterpenes, amorphous polypropylene, ethylene vinyl acetate copolymers, microcrystalline wax, alkali metal sulfosuccinates, and mono- and di- glycerides of fatty acids, such as glycerol monostearate, glycerol monooleate, sorbitan monolaurate, sorbitan monopalmitate, sorbitan monostearate and sorbitan monooleate. Preferably, the tackifier is polybutene.

The cling additive can be present in the A layer in any concentration which will permit the A surface to cling to the cling-free surface of a second like film of like composition or other surfaces. A preferred concentration can range from about 0.1 to 20% by weight of the A layer, most preferably between 0.25 to 6.0 weight percent.

A particularly preferred embodiment of this invention is a co-extruded A/B/C film structure wherein layer B has been bonded through the co-extrusion process to layers A and the cling-free layer, layer C. Layer B is characterized by a high tensile strength and is chiefly responsible for rendering high tensile strength to the A/B/C film structure. This thermoplastic film structure exhibits a machine directional tensile strength between about 4,000 to about 12,000 psi, as measured by ASTM D 882. Generally, the tensile strength is between about 6,000 to about 7,000 psi. The cling force of the A surface of this A/B/C film to the A surface of a like A/B/C film (of identical composition) is between about 150 g to about 400 g. In addition, the cling force of the A surface to the C surface of a like A/B/C film is between about 100 g to about 350 g. The A/B/C film structure of this invention further has a minimum stretch capability of about 200%, and a maximum stretch capability of about 600%, preferably between 250 and 450%, as measured by ASTM D4649 (A1.2.2). Such minimum stretch capability is desired due to the continuous stretching of the film roll caused by the braking tension applied to the roll after the film is laid about the girth of the pallet platform during overwrapping.

The film should have an A to B to C weight ratio of from about 5:90:5 to about 30:40:30, most preferably about 10:80:10. The film will have an overall thickness ranging from about 0.3 mil to about 3.0 mil, preferably 0.8 mil. In general, the thickness of the A layer is between about 0.025 to about 0.9 mils. The thickness of the B layer is between about 0.020 to about 2.7 mils and the thickness of the C layer is between about 0.025 to about 0.9 mils. The A layer is preferably between 5 and 15 weight % of the overall film thickness; the B layer is between 70 and 90% of the overall film thickness; and the C layer is between and 15% of the overall film thickness.

The C layer of this film is fabricated from the polyolefin described above as the "cling-free layer" for the film structure of this invention.

The B layer exhibits a minimum machine directional tensile strength value ranging from about 4,000 psi to about 12,000 psi, preferably about 7,000 psi, as measured by ASTM D882. Suitable as the resin film-forming composition for the B layer for use in this invention are polyolefins such as polyethylene and copolymers of ethylene and/or propylene and a minor amount of a $C_4$–$C_{12}$ mono-olefinic monomer such as butene-1 and isobutylene. Especially preferred is LLDPE, as defined herein. The B layer is most preferably chemically distinct from the film-forming resins of layers A and C, i.e. the film-forming resins of layers A and C are not identical to the film-forming resin of layer B. In the most preferred embodiment of the invention the film is fabricated from three chemically distinct resin film-forming systems.

The stretch wrap films of this invention are formed by conventional techniques of coextrusion to assemble the composite structure, such as by the simultaneous coextrusion of resin film-forming layers. The melt temperature for each extruder is independently selected such that the viscosity of the different film components is matched. In such co-extrusion processes, the three extruders should be operating simultaneously to produce the coextruded film. Thus, the output capacity for each of the three extruders should be close to equivalent.

For example, to produce a 10:80:10 (w/w) A/B/C film structure, if the core (center) extruder for layer B is relatively small (1.5 inch diameter, 24:1 L:D) then the satellite extruders for layers A and C must be proportionately smaller. If on the other hand the core extruder is relatively large (6 inch diameter, 30/1 L/D) then the size of the satellite extruders must be increased in order for the film layer ratios to remain relatively constant. In addition, the melt viscosity of all three components must be approximately the same. Generally, the viscosity of the resin forming systems of the respective layers are matched. For instance in the fabrication of the A/B/C film, layers A and C are matched to the viscosity of the resin film-forming system of layer B. Thus, if the viscosity of the resin in the A or C extruder becomes lower than that of the core layer at any given temperature, then its melt temperature must be reduced to increase its viscosity. If the viscosity of the resin in the A or C extruder becomes higher than that of the resin film-forming system of the B layer, then its melt temperature must be increased to decrease its viscosity. Since each extruder of the film-forming system B operates at a separate melt temperature, the temperature profile of the zones in each extruder will likewise differ.

In preparing the extrudate of the present invention, the resin film-forming systems of the respective layers are fed into the feed hopper of a conventional rotating screw extruder. The resin is melted by working it in the compression zone of the extruder. The molten resin is continuously advanced through the metering zone to the mixing zone of the extruder.

It is readily recognized in the art that the production of thicker extrudates either requires an operator to increase the speed of the extruder or decrease the line speed, i.e. the rate the extrudate is removed from the dye. Modern extrusion apparatus naturally have maximum speeds and minimum line speeds that can complicate the process. As previously stated the viscosity of the resin film-forming system of the layers of the film structures of this invention must be approximately the same during co-extrusion. The melt viscosity of the preferred polyolefin resin film-forming system of the cling-free layer, i.e., homopolypropylene and propylene-o-olefin copolymers, rapidly decreases with an increase in temperature. The addition of between about 10 to about 50 weight percent (based on total weight percent of resin film-forming system) of high density polyethylene or medium density polyethylene to the polyolefin dramatically reduces the extruder speed required to produce the film structure or layer. Most preferably the resin film-forming system comprises approximately 35–40 weight percent of medium or high density polyethylene. In addition, the viscosity of the resin film-forming system containing the medium or high density polyethylene/polyolefin blend is similar to that of the resin film-forming compositions which do not contain medium or high density polyethylene. Thus, medium and high density polyethylene serve as an invaluable processing aid to molten extrudates of polyolefin.

While the use of medium or high density polyolefin with polypropylene is preferably realized in the fabrication of the cling-free layer of the film structure of this invention, it is also within the scope of this invention to provide a single film structure or even a laminate with such composition. Thus, the use of the medium and high density polyethylene/polyolefin blend is not restricted to the production of the cling-free layer of an A/B/C or A/B film structure but is equally applicable in the production of a single film structure or laminate.

EXAMPLES

General Procedure

In preparing the A/B/C extrudates of the present invention any known prior art technique for coextrusion can be employed. The resin film-forming composition of each layer is fed into the feed hopper of a conventional rotating screw extruder. The extruder screw employed can have approximately a 5 inch (1.5 inches for Examples 1–4 and 8–16) diameter and a length to diameter, L/D, ratio of about 30:1. Satellite extruders are used for the coextrusion of the resin film-forming compositions A and C. The satellite extruders comprise a conventional extruder having an extruder screw with about a 2.5 inch (0.75 inches for Examples 1–4 and 8–16) diameter and a L/D ratio of about 30:1. Molten resin from the satellite extruders are fed into the slot film die affixed to the end of the B extruder through an adapter specifically designed to join polymer streams A and C from the satellite extrudates to the molten B polymer stream so that it effectively interfaces with the molten surface of the B layer. These three separate streams are then passed out of the film forming die with a die gap of approximately of 15 to 20 mil at a melt temperature of approximately 420° F. (A layer), 510° F. (B layer), and 480° F. (C layer).

GLOSSARY

As used herein, the materials recited in these Examples are commercially available. In the examples the actual material used is indicated by reference to the corresponding glossary number.

| MATERIAL | DENSITY | MELT FLOW ASTM D1238 | COMMERCIALLY AVAILABLE AS | SOURCE |
| --- | --- | --- | --- | --- |
| 1. Polypropylene | | 12.0 | 3014 | Exxon Chemical Co. |

| MATERIAL | DENSITY | MELT FLOW ASTM D1238 | COMMERCIALLY AVAILABLE AS | SOURCE |
| --- | --- | --- | --- | --- |
| 2. Polypropylene | | 2.9 | 5A08 | Shell Oil Co. |
| 3. Propylene/ethylene copolymer | | 4.0 | 7C49 | Shell Oil Co. |
| 4. Polypropylene | | 3.9 | 4062 | Exxon Chemical Co. |
| 5. Polypropylene | | 3.0 | HGX-030 | Philips Pet. Co. |
| 7. Polypropylene | 3.0 | 2104 | Soltex, Inc. | |
| 8. Propylene/α-olefin copolymer | | 4.0 | 4207 | Soltex, Inc. |
| 20. LLDPE | 0.917 | 2.3 | 2047 | Dow Chemical Co. |
| 21. LMDPE | 0.935 | 2.5 | 2036A | Dow Chemical Co. |
| 22. LMDPE | 0.926 | 2.0 | 2032 | Dow Chemical Co. |
| 23. LLDPE | 0.912 | 3.3 | 4004 | Dow Chemical Co. |
| 30. Tackifier (52% of polybutene in LLDPE) | | | | Santech Co. |
| 35. Styrene-Butadiene Copolymer | | | KR-10 | Phillips Pet. Co. |
| 40., 41. Methacrylic acid copolymer (MMA) - a copolymer of ethylene and approximately 20-30 wt. % methacrylate acid, commercially known as XC-102[40] and XC-101[41] from Exxon Chemical Company. | | | | |
| 51. HDPE | 0.962 | 10.0 | 10062 | Dow Chemical Co. |

COMPARATIVE EXAMPLE 1

Film 1 has a composition as follows: Layer A (15% by weight of total film) is LLDPE[2] [3] with 6% tackifier[30]; Layer B is LLDPE[20] (approximately 70% by weight of total film); and Layer C (15%) is LLDPE[20] with 0.5% silicon dioxide slip agent. The cling properties are presented in Table 1.

COMPARATIVE EXAMPLE 2

Film 2 has the same composition as Film 1, except that Layer C does not contain silicon dioxide slip agent. The cling properties are presented in Table 1.

COMPARATIVE EXAMPLE 3

Film 3 has the same composition as Film I, except that Layer C is LMDPE[21]. The cling properties are presented in Table 1.

EXAMPLE 4

Film 4 has the same composition as Film 1, except that Layer C is a polypropylene homopolymer[2].

TABLE I

| Ex. | CLING (g) A/A | CLING (g) C/C |
| --- | --- | --- |
| Comp. Ex. 1 | 325 | 25 |
| Comp. Ex. 2 | 230 | 170 |
| Comp. Ex. 3 | 270 | 70 |
| 4 | 325 | (NA)* |

*The C/C cling value could not be evaluated utilizing the standard cling test. However, the coefficient of friction (ASTM D-1894) was determined to be 0.5.

Table 1 is illustrative of some of various approaches taken in the past concerning the non-cling surface of single-sided cling film. Example 2 shows that LLDPE is not a preferred material due to its substantial cling to itself. Example 1 shows that addition of noncling additives provide enhancement of the desired noncling property. Example 3 shows that an increase in the density has limited enhancement of non-cling properties. Example 4, on the other hand, shows true non-cling properties. The standard test for cling (ASTM D4649) cannot be used to quantitate the cling properties of this material. As a result a more sensitive test—the coefficient of friction (ASTM D1894) was employed.

EXAMPLE 5-6 AND COMPARATIVE EXAMPLE 7

Resin film-forming compositions were prepared as extrudates in accordance with the General Procedure above. Percentages are weight percentages. The speed of the extruder is indicated. Table II reports the cling data ASTM D4649, Standard Guide for Selection of Stretch Wrap Materials:

| | EX 5 | EX 6 | COMP EX 7 |
| --- | --- | --- | --- |
| A layer, MMA[40], wt % | 10 | 10 | 10 |
| B layer, LLDPE[20], wt % | 80 | 80 | 80 |
| C layer, Polypropylene[4] wt % | 10 | 5 | 0 |
| C layer, HDPE, wt % | 0 | 5 | 10 |
| Extruder A rpm | 35.8 | 30 | 30 |
| Extruder B rpm | 47.8 | 30 | 30 |
| Extruder C rpm | 111.9 | 30 | 30 |
| Cast Roll, Ft. per min. | 746 | 311 | 380 |

These examples demonstrate that productivity in the fabrication of the film structures for a given thickness is increased by employinq high density polyethylene[51] as a processing aid. Example 5 illustrates that the C extruder requires a higher rpm output when 100% polypropylene is used in the fabrication of a C layer comprising 10% thickness. The maximum output capacity for extruders A, B, C was 125 rpm. The productivity improvement potential for extruder C of Example 6 is 4.16 (125 rpm÷30 rpm). The maximum operation potential is 1296 feet per minute (fpm) (311 fpm×4.16). In contrast the productivity improvement potential for extruder C of Example 5 is 1.12 (125 rpm÷111.9 rpm). The maximum operation potential is 833.3 fpm (746 fpm x 1.12). The productivity improvement is approximately 56%. Less rpm for the C extruder is required when the processing aid HDPE is used.

TABLE II

| EXAMPLE | % STRETCH 100 | % STRETCH 150 | % STRETCH 200 |
| --- | --- | --- | --- |
| 5 | Fair | Fair | Fair |
| 6 | Fair | Fair | Fair |
| 7 | Fair | Poor | None |

EXAMPLES 8-16

The films were prepared in accordance with the procedures of Exs. 5-6 and Comparative example 7 above. 10% of the film comprised layers A and C and 80% layer B. Respective cling forces are compiled in Table III. Data for dynamic coefficient of friction, ASTM D-1894, is compiled in Table IV.

|  | A LAYER | B LAYER | C LAYER |
|---|---|---|---|
| Comp. Ex. 8 | Methacrylic Acid Copolymer[41] | LLDPE[20] | LLDPE[21] |
| Comp. Ex. 9 | Methacrylic Acid Copolymer[40] | LLDPE[20] | Styrene-butadiene[35] |
| Ex. 10 | 94% LLDPE[23] 6% polybutene[30] | LLDPE[20] | Polypropylene[7] |
| Ex. 11 | 94% LLDPE[23] 6% polybutene[30] | LLDPE[20] | Polypropylene[8] |
| Ex. 12 | 94% LLDPE[23] 6% polybutene[30] | LLDPE[20] | Polypropylene[2] |
| Ex. 13 | 94% LLDPE[23] 6% polybutene[30] | LLDPE[20] | Polypropylene[3] |
| Comp. Ex. 14 | 94% LLDPE[23] 6% polybutene[30] | LLDPE[20] | Polypropylene[1] |
| Ex. 15 | 94% LLDPE[23] 6% polybutene[30] | LLDPE[20] | Polypropylene[4] |
| Ex. 16 | 94% LLDPE[23] 6% polybutene[30] | LLDPE[20] | Polypropylene[5] |

TABLE III

| EX. | A/A | A/C | C/C |
|---|---|---|---|
| 8 | 364 ± 96 | 225 ± 42 | NA |
| 9 | 35 | 40 | NA |
| 10 | 280 ± 51 | 143 ± 39 | NA |
| 11 | 176 ± 28 | 157 ± 16 | NA |
| 12 | 324 ± 72 | 198 ± 66 | NA |
| 13 | 513 ± 55 | NA | NA |
| 14 | 347 ± 50 | 191 ± 28 | NA |
| 15 | 217 ± 11 | 124 ± 24 | NA |
| 16 | 442 ± 20 | 192 ± 81 | NA |

TABLE IV

| EX. |  |
|---|---|
| 8 | >2.0 |
| 9 | >2.0 |
| 10 | 0.55 |
| 11 | 0.59 |
| 12 | 0.49 |
| 13 | 0.70 |
| 14 | >2.0 |
| 15 | 0.65 |
| 16 | 0.51 |

EXAMPLE 17

The number of breaks a 1500 foot roll of 20 inches wide of the film structure prepared in Example 6 having a total thickness of 0.8 mils was determined by using a pallet wrapper commercially available from Lamtech, Inc. of Louisville, Ky. The film was prestretched 225% by making the second prestretch roller run 2¼ times the rpm of the first roller. Minimal relaxation was permitted. The number of breaks in every 1500 feet of film was determined, ASTM 4649.

|  | Example* 17 |
|---|---|
| % stretch (measured on pallet) | 210 |
| width of roll/inches | 20 |
| No. of breaks | 0 |

*4 rolls tested

The invention has been described with reference to its preferred embodiments. From this description, a person of ordinary skill in the art may appreciate changes that could be made in the invention which do not depart from the scope and spirit of the invention as described above and claimed hereafter.

What is claimed is:

1. A stretch wrap thermoplastic A/B/C film having minimum stretch capability of 200% comprising:
    a polyolefinic A layer having a cling force to the C layer between about 100 to about 350 g wherein the A layer is selected from the group consisting of polyethylene, atactic polypropylene, copolymers of ethylene and propylene, and polymers obtained from (i) ethylene and/or propylene and (ii) an ethylenically unsaturated monomer;
    a polyolefinic B layer having a tensile strength between about 4,000 to about 12,000 psi; and
    a C layer having a cling force in a non-stretched condition to another C layer according to ASTM D4649 of approximately zero wherein said C surface is fabricated from a film forming system free of a slip additive and comprising a polyethylene or polypropylene having a melt flow rate, in accordance with ASTM D-1238, less than 10.0.

2. The stretch wrap film of claim 1, wherein the cling force of the A layer to another A layer as measured according to ASTM D4649 is between about 150 to about 400 g.

3. The stretch wrap film of claim 1, wherein the coefficient of friction of the C layer to another C layer as measured according to ASTM 1894 is less than 2.0.

4. The stretch wrap film of claim 3, wherein said coefficient of friction is less than 1.0.

5. A stretch wrap thermoplastic A/B/C film comprising:
    a polyolefinic A layer having cling force to the C layer wherein the A layer is selected from the group consisting of polyethylene, atactic polypropylene, copolymers of ethylene and propylene, and polymers obtained from (i) ethylene and/or propylene and (ii) an ethylenically unsaturated monomer;
    a polyolefinic B layer having a tensile strength between about 4,000 to about 12,000 psi; and
    a C layer having a substantially non-cling surface when in a non-stretched condition fabricated from a resin film forming system free of a slip additive and comprising a polyethylene or polypropylene having a MFR less than or equal to 10.0.

6. The stretch wrap film of claim 5, wherein the coefficient of friction of the C surface of said film to another C surface as measured according to ASTM 1894 is less than 2.0.

7. The stretch wrap film of claim 6, wherein said coefficient of friction is less than 1.0.

8. The stretch wrap film of claim 6 wherein the tensile strength of the B layer is between about 6,000 to about 7,000 psi.

9. The stretch wrap film of claim 5, wherein the A:B:C weight ratio is between from about 5:90:5 to about 30:40:30.

10. The stretch wrap film of claim 9, wherein the A:B:C ratio is approximately 10:80:10.

11. The stretch wrap film of claim 5, wherein said B layer is fabricated from a polyolefin selected from the group consisting of polyethylene and a copolymer selected from ethylene, propylene and a $C_4$–$C_{12}$ monoolefin.

12. The stretch wrap film of claim 5, wherein the film-forming system further comprises high density polyethylene or medium density polyethylene.

13. The stretch wrap film of claim 12, wherein between about 10 to about 50 weight percent of said resin film-forming system comprises high density polyethylene.

14. The stretch wrap film of claim 1, wherein the resin film-forming system further comprises medium density polyethylene or high density polyethylene.

15. The stretch wrap film of claim 14, wherein between about 10 to about 50 weight percent of said resin film-forming system comprises high density polyethylene.

16. A stretch wrap thermoplastic film which comprises a surface having a cling property and an opposite surface having substantially no cling property and further wherein the cling-free surface is fabricated from a film-forming system containing a resin having an MFR less than or equal to 10.0 wherein said resin is selected from the group consisting of polyethylene and polypropylene.

17. The stretch wrap film of claim 16 wherein said resin film-forming system further comprises between about 10 to about 50 weight percent of a high density polyethylene or medium density polyethylene.

18. The stretch film of claim 16, wherein said film is a A/B/C layer film structure.

19. The stretch wrap film of claim 1, wherein the B layer is fabricated from a polyolefin selected from the group consisting of polyethylene and a copolymer selected from ethylene, propylene and a $C_4$–$C_{12}$ monoolefin.

* * * * *